US010319309B2

(12) United States Patent
Kim et al.

(10) Patent No.: US 10,319,309 B2
(45) Date of Patent: Jun. 11, 2019

(54) DISPLAY DEVICE THAT CORRECTS FOR VARIATIONS BETWEEN REFERENCE VOLTAGES AND METHOD FOR DRIVING THE SAME

(71) Applicant: LG Display Co., Ltd., Seoul (KR)

(72) Inventors: Junghyeon Kim, Goyang-si (KR); Jinhan Yoon, Gimhae-si (KR); Hanjin Bae, Paju-Si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/783,832

(22) Filed: Oct. 13, 2017

(65) Prior Publication Data

US 2018/0114492 A1 Apr. 26, 2018

(30) Foreign Application Priority Data

Oct. 25, 2016 (KR) ........................ 10-2016-0139176

(51) Int. Cl.

*G06F 3/038* (2013.01)
*G09G 5/00* (2006.01)
*G09G 3/3291* (2016.01)
*G09G 3/20* (2006.01)
*G09G 3/3233* (2016.01)
*G09G 3/3266* (2016.01)

(52) U.S. Cl.

CPC ......... *G09G 3/3291* (2013.01); *G09G 3/2088* (2013.01); *G09G 3/3233* (2013.01); *G09G 3/3266* (2013.01); *G09G 2310/027* (2013.01); *G09G 2310/0221* (2013.01); *G09G 2310/0297* (2013.01); *G09G 2310/08* (2013.01); *G09G 2320/0233* (2013.01); *G09G 2330/021* (2013.01); *G09G 2330/028* (2013.01); *G09G 2330/12* (2013.01)

(58) Field of Classification Search

None

See application file for complete search history.

(56) References Cited

U.S. PATENT DOCUMENTS

| | | | | |
|---|---|---|---|---|
| 2008/0291387 A1* | 11/2008 | Yang | G06F 1/1601 | 349/187 |
| 2010/0053145 A1* | 3/2010 | Morita | G09G 3/3688 | 345/213 |
| 2015/0348492 A1* | 12/2015 | Park | G09G 3/3666 | 345/205 |
| 2016/0049111 A1* | 2/2016 | Lee | G09G 3/3291 | 345/691 |
| 2016/0133189 A1* | 5/2016 | Kang | G09G 3/3258 | 345/211 |

OTHER PUBLICATIONS

European Extended Search Report, European Application No. 17197797.8, dated Mar. 20, 2018, 8 pages.

* cited by examiner

*Primary Examiner* — Abdul-Samad A Adediran
*Assistant Examiner* — Kirk W Hermann
(74) *Attorney, Agent, or Firm* — Fenwick & West LLP

(57) ABSTRACT

The present invention provides a display device that comprises a display panel displaying an image, M reference voltage generators (M is an integer of 2 or greater) that respectively supply reference voltages to N display areas (N is an integer of 2 or greater) defined on the display panel, and a voltage variation corrector that corrects for voltage variations between the M reference voltages (M is an integer of 2 or greater).

7 Claims, 10 Drawing Sheets

DISPLAY DEVICE THAT CORRECTS FOR VARIATIONS BETWEEN REFERENCE VOLTAGES AND METHOD FOR DRIVING THE SAME

CROSS REFERENCE TO RELATED APPLICATIONS

This application claims the priority benefit of Republic of Korea Patent Application No. 10-2016-0139176 filed on Oct. 25, 2016, which is hereby incorporated herein by reference in its entirety.

BACKGROUND

Field of Technology

The present disclosure relates to a display device and a method for driving the same.

Description of the Related Art

The market for displays which act as an intermediary between users and information is growing with the development of information technology. Thus, display devices such as organic light-emitting displays (OLEDs), liquid crystal displays (LCDs), and plasma display panels (PDPs) are increasingly used.

An organic light-emitting display comprises a display panel comprising a plurality of subpixels and a drive part that drives the display panel. The drive part comprises a scan driver that supplies scan signals (or gate signals) to the display panel and a data driver that supplies data signals to the display panel. When a scan signal, a data signal, etc. are supplied to the subpixels on the organic light-emitting display, selected subpixels emit light, thereby displaying an image.

On the display panel, the subpixels are implemented based on devices, such as thin-film transistors that are formed on a substrate by deposition. Due to differences in intrinsic characteristics such as threshold voltage, devices such as thin-film transistors require compensation even in an initial stage in order to exhibit uniform brightness characteristics, and they degrade when driven for a long time, like a threshold voltage shift or a decrease in lifetime. When device degradation occurs, the brightness characteristics of the display panel which displays images based on these devices change too.

In the conventionally proposed solution, data voltages compensated through parameters are applied to each pixel, in order to compensate for variations in device characteristics, and a common reference voltage of a particular level is applied to adjust brightness level. Implementing a multi-sectional, large-screen and high-resolution organic light-emitting display by the above compensation method may cause variations in brightness between split screens due to variations in reference voltage. Thus, there is a need for research on output variations between reference voltage generators that generate reference voltages.

SUMMARY

The present disclosure provides a display device comprising: a display panel displaying an image; M reference voltage generators (M is an integer of 2 or greater) that respectively supply reference voltages to N display areas (N is an integer of 2 or greater) defined on the display panel; and a voltage variation corrector that corrects for voltage variations between the M reference voltages (M is an integer of 2 or greater).

In another aspect, the present disclosure provides a method for driving a display device, the display device comprising M reference voltage generators (M is an integer of 2 or greater) that respectively supply reference voltages to N display areas (N is an integer of 2 or greater) defined on a display panel and a voltage variation corrector that corrects for voltage variations between the M reference voltages (M is an integer of 2 or greater), the method comprising: obtaining the reference voltages output from the M reference voltage generators (M is an integer of 2 or greater); extracting correction parameters based on the obtained reference voltages; generating correction values for correcting for the voltage variations between the reference voltages based on the extracted correction parameters; and supplying the correction values to the reference voltage generators.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the disclosure, examples of which are illustrated in the accompanying drawings.

Hereinafter, a concrete example according to an exemplary embodiment of the present disclosure will be described with reference to the accompanying drawings.

A display device according to the present disclosure is implemented as a television, a video player, a personal computer (PC), a home theater, a smartphone, etc. An organic light-emitting display will be given as an example of the display device according to the present disclosure. However, this is merely for illustration, and other types of display devices may be applicable as long as they can perform compensations using reference voltages.

Moreover, a thin-film transistor to be described below may be referred to as a source electrode and a drain electrode or as a drain electrode and a source electrode depending on the type, but without a gate electrode. Thus, the thin-film transistor will be described as a first electrode and a second electrode so that it is not limited by such terms.

Figure 1:
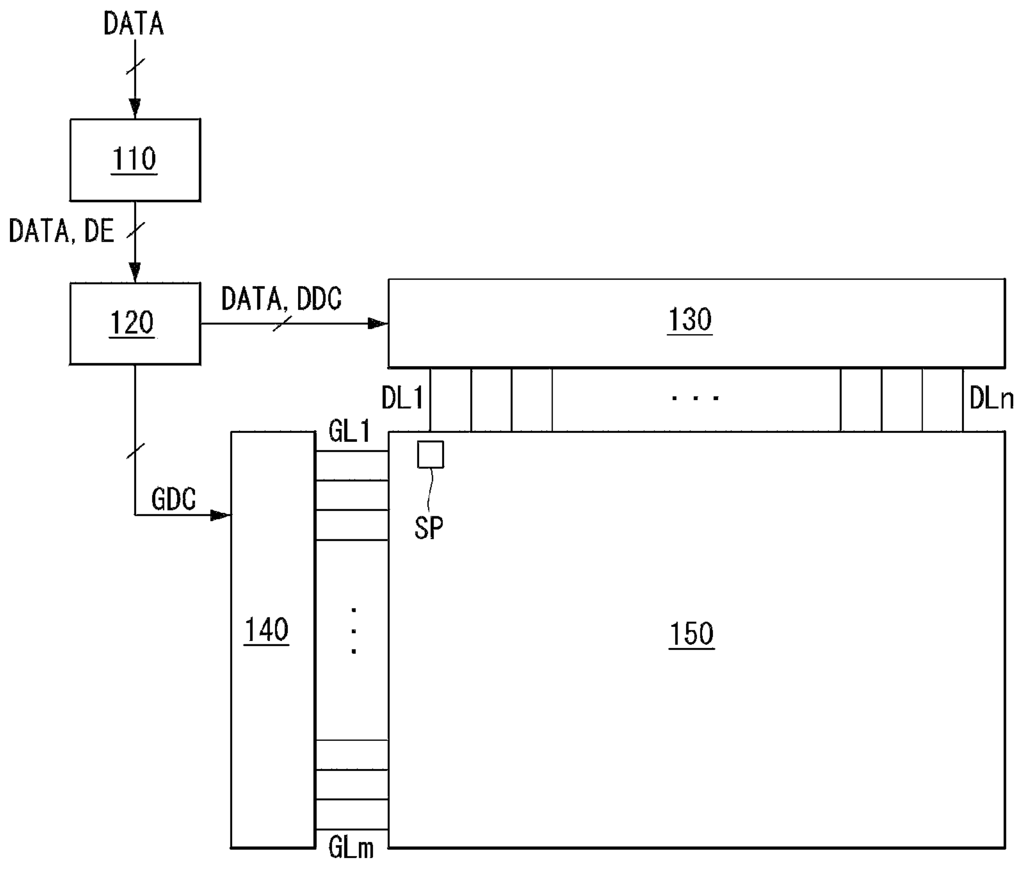
FIG. 1 is a schematic block diagram of an organic light-emitting display according to an exemplary embodiment of the present disclosure.
Figure 2:
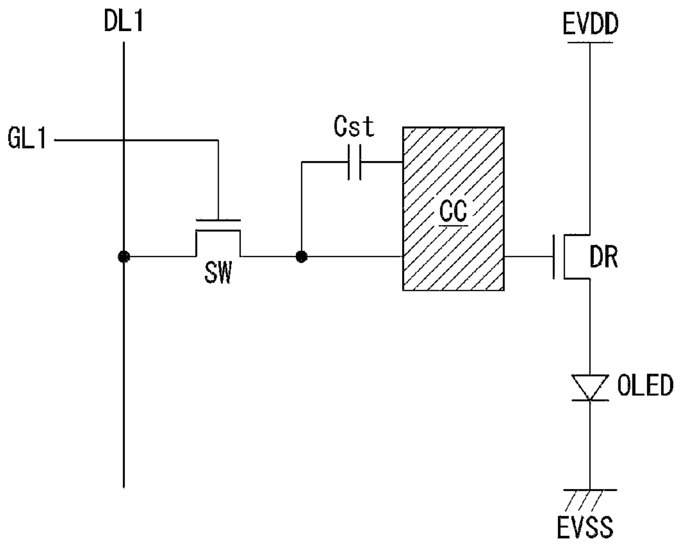
FIG. 2 is a schematic circuit diagram of a subpixel according to an exemplary embodiment of the present disclosure.
Figure 3:
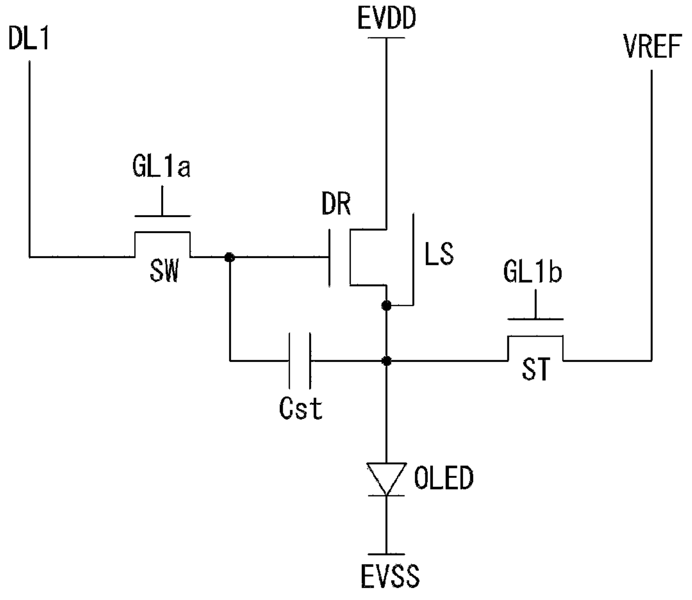
FIG. 3 is a detailed circuit diagram of a subpixel according to an exemplary embodiment of the present disclosure.
Figure 4:
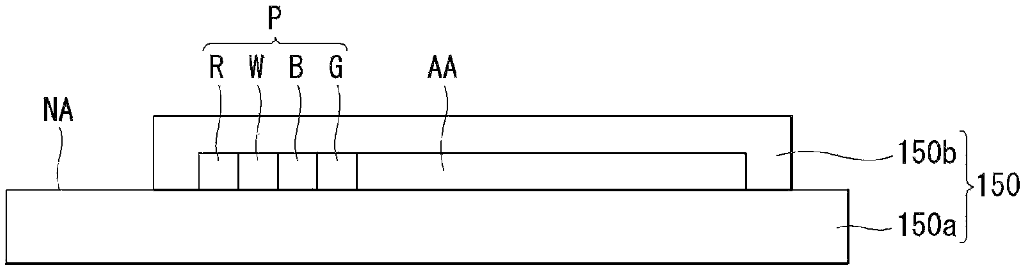
FIG. 4 is an illustration of a cross-section of a display panel according to an exemplary embodiment of the present disclosure.

FIG. 1 is a schematic block diagram of an organic light-emitting display according to an exemplary embodiment of the present disclosure. FIG. 2 is a schematic circuit diagram of a subpixel. FIG. 3 is a detailed circuit diagram of a subpixel according to an exemplary embodiment of the present invention. FIG. 4 is an illustration of a cross-section of a display panel according to an exemplary embodiment of the present disclosure.

As illustrated in FIG. 1, an organic light-emitting display according to an exemplary embodiment of the present disclosure comprises an image processor 110, a timing controller 120, a data driver 130, a scan driver 140, and a display panel 150.

The image processor 110 outputs a data enable signal DE, etc., along with an externally supplied data signal DATA. In addition to the data enable signal DE, the image processor 110 may output one or more among a vertical synchronization signal, a horizontal synchronization signal, and a clock signal. But, these signals will be omitted in the drawings for convenience of explanation.

The timing controller 120 receives the data signal DATA from the image processor 110, along with the data enable signal DE or driving signals including the vertical synchronization signal, horizontal synchronization signal, and clock signal. The timing controller 120 outputs a gate timing control signal GDC for controlling the operation timing of the scan driver 140 and a data timing control signal DDC for controlling the operation timing of the data driver 130, based on the driving signals.

The data driver 130 samples and latches the data signal DATA supplied from the timing controller 120 responsive to the data timing control signal DDC being supplied from the timing controller 120. The data driver 130 converts digital data signal DATA to an analog data signal and outputs the analog data signal, in conjunction with an internal or external programmable gamma part. The data driver 130 outputs data signals DATA through data lines DL1 to DLn. The data driver 130 may be provided in the form of an IC (integrated circuit).

The scan driver 140 outputs a scan signal responsive to the gate timing control signal GDC being supplied from the timing controller 120. The scan driver 140 outputs scan signals through scan lines GL1 to GLm. The scan driver 140 is provided in the form of an IC (integrated circuit), or provided on the display panel 150 in the form of a gate-in-panel.

The display panel 150 displays an image in response to the data signals DATA and scan signals respectively supplied from the data driver 130 and scan driver 140. The display panel 150 comprises subpixels SP that display an image.

The subpixels are formed by a top-emission scheme, bottom-emission scheme, or dual-emission scheme depending on the structure. The subpixels SP may comprise red subpixels, green subpixels, and blue subpixels, or may comprise white subpixels, red subpixels, green subpixels, and blue subpixels. The subpixels SP may have one or more different light-emission areas depending on the light-emission characteristics. The subpixels SP may produce white, red, green, and blue based on a white organic-emitting layer and red, green, and blue color filters, but are not limited thereto.

As illustrated in FIG. 2, one subpixel comprises a switching transistor SW, a driving transistor DR, a capacitor Cst, a compensation circuit CC, and an organic light-emitting diode OLED.

The switching transistor SW acts as a switch in response to a scan signal supplied through the first scan line GL1 to store a data signal supplied through the first data line DL1 as a data voltage in the capacitor Cst. The driving transistor DR causes a drive current to flow between a first power supply line EVDD and a second power supply line EVSS by the data voltage stored in the capacitor Cst. The organic light-emitting diode OLED emits light by the drive current formed by the driving transistor DR.

The compensation circuit CC is a circuit that is added within the subpixel to compensate for a threshold voltage, etc. of the driving transistor DR. The compensation circuit CC comprises of one or more transistors. The configuration of the compensation circuit CC varies widely depending on the method of compensation, and an example thereof will be described below.

As illustrated in FIG. 3, the compensation circuit CC comprises a sensing transistor ST and a sensing line VREF. The sensing transistor ST is connected between a source line of the driving transistor DR and an anode (hereinafter, "sensing node") of the organic light-emitting diode OLED. The sensing transistor ST may operate to supply a reference voltage (or sensing voltage) delivered through the sensing line VREF to the sensing node or sense the voltage or current in the sensing node.

The switching transistor SW has a first electrode connected to a first data line DL1 and a second electrode connected to a gate electrode of the driving transistor DR. The driving transistor DR has a first electrode connected to the first power supply line EVDD and a second electrode connected to the anode of the organic light-emitting diode OLED. The capacitor Cst has a first electrode connected to the gate electrode of the driving transistor DR and a second electrode connected to the anode of the organic light-emitting diode OLED. The organic light-emitting diode OLED has the anode connected to the second electrode of the driving transistor DR and a cathode connected to the second power supply line EVSS. The sensing transistor ST has a first electrode connected to the sensing line VREF and a second electrode connected to the anode of the organic light-emitting diode OLED that is a sensing node.

The operating time of the sensing transistor ST may be similar/equal to that of the switching transistor SW or different from it, depending on the compensation algorithm (or the compensation circuit configuration). The switching transistor SW may have a gate electrode connected to a scan line GL1*a*, and the sensing transistor ST may have a gate electrode connected to a scan line GL1*b*. In another example, the scan line GL1*a* connected to the gate electrode of the switching transistor SW and the scan line GL1*b* connected to the gate electrode of the sensing transistor ST may be commonly connected so as to be shared.

The sensing line VREF may be connected to the data driver. In this case, the data driver may sense the sensing node of the subpixel in real time, during a non-display period of an image or for an N frame period (N is an integer of 1 or greater), and may generate a sensing result. The switching transistor SW and the sensing transistor ST may be turned on simultaneously. In this case, a sensing operation through the sensing line VREF and a data output operation of outputting a data signal may be done separately based on a time-division system of the data driver.

A light blocking layer LS is provided to block ambient light. The light blocking layer LS may cause the problem of parasitic voltage charging when formed from a metallic material. Due to this, the light blocking layer LS may be disposed only below a channel region of the driving transistor DR, or may be disposed below channel regions of the switching transistor SW and sensing transistor ST. Meanwhile, the light blocking layer LS may be used simply for the purpose of blocking ambient light, or the light blocking layer LS may be used as an electrode that facilitates a connection with other electrodes or lines and forms a capacitor, etc.

Targets to be compensated for according to the sensing result may include a digital data signal, an analog data signal, or a gamma voltage. The compensation circuit, which generates a compensated signal (or compensated voltage) based on the sensing result, may be implemented as an internal circuit of the data driver, as an internal circuit of the timing controller, or as a separate circuit.

FIG. 3 illustrates, by way of example, a subpixel having a 3-transistors/1-capacitor structure comprising the switching transistor SW, the driving transistor DR, the capacitor Cst, the organic light-emitting diode OLED, and the sensing transistor ST. However, when a compensation circuit CC is added, the subpixel may be configured to have a 3T2C, 4T2C, 5T1C, or 6T2C structure.

As illustrated in the FIG. 4, subpixels P are formed in a display area AA of a first substrate 150*a* of the display panel 150, based on the circuit explained with reference to FIG. 3. The subpixels formed in the display area AA are sealed by a protective film (or a protective substrate) 150*b* of the display panel 150. Area NA refers to a non-display area.

The subpixels P may be horizontally or vertically arranged in the display area AA, for example, in order of red (R), white (W), blue (B), and green (G) colors. The red, white, blue, and green subpixels R, W, B, and G may form a single pixel P. However, the sequence of the subpixels P may be altered in various ways depending on emitting materials, light-emission areas, the compensation circuit configuration (or structure), and so on. Also, the red, blue, and green subpixels R, B, and G may form a single pixel P.

On the above-described display panel, the subpixels are implemented based on devices, such as thin-film transistors that are formed on a substrate by deposition. Devices such as thin-film transistors degrade when driven for a long time, like a threshold voltage shift or a decrease in lifetime. When device degradation occurs, the brightness characteristics of the display panel which displays images based on these devices change too.

In the organic light-emitting display according to the present disclosure, data voltages compensated through parameters are applied to each pixel, in order to compensate for variations in device characteristics, and a common reference voltage of a particular level is applied to adjust brightness level.

A large-screen and high-resolution organic light-emitting display requires a plurality of reference voltage generators that generate and output reference voltage when the display panel is driven in multiple sections. The reference voltage generators may be implemented as gamma voltage generators or power supply parts that may change voltage in a programmable fashion.

However, when implementing such a large-screen and high-resolution organic light-emitting display by the above compensation method, output variations between the reference voltage generators should be taken into consideration, and thus, there is a need for research on this.

Hereinafter, descriptions will be made with respect to the problem of output variations between the reference voltage generators and a test example and exemplary embodiments of the present invention for solving this problem.

Test Example

Figure 5:
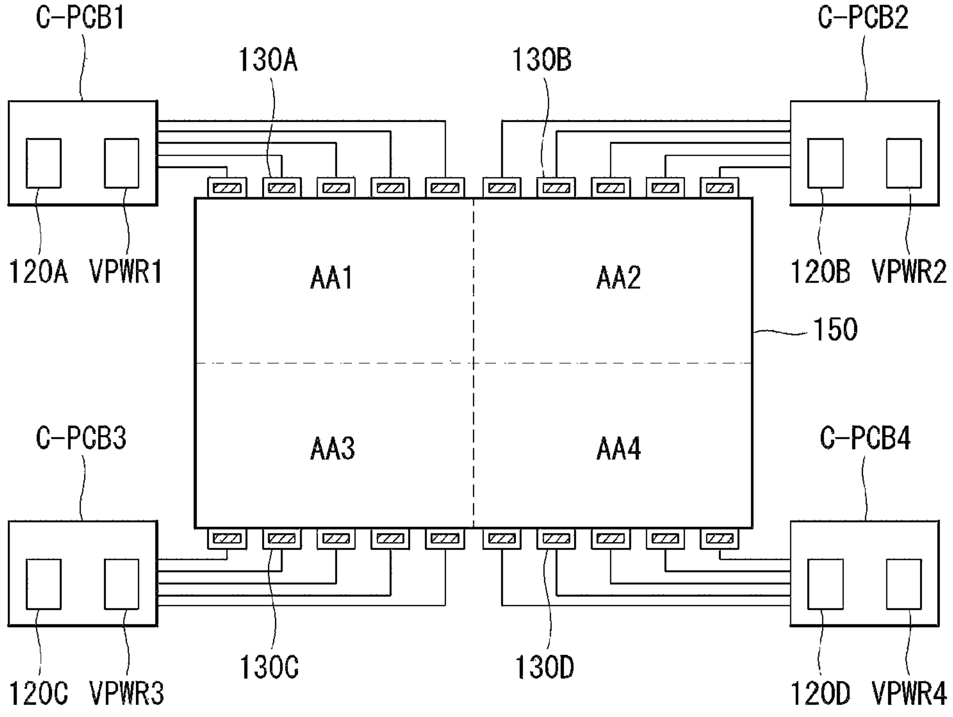
FIG. 5 is a schematic block diagram of an organic light-emitting display according to a test example according to an exemplary embodiment of the present disclosure.
Figure 6:
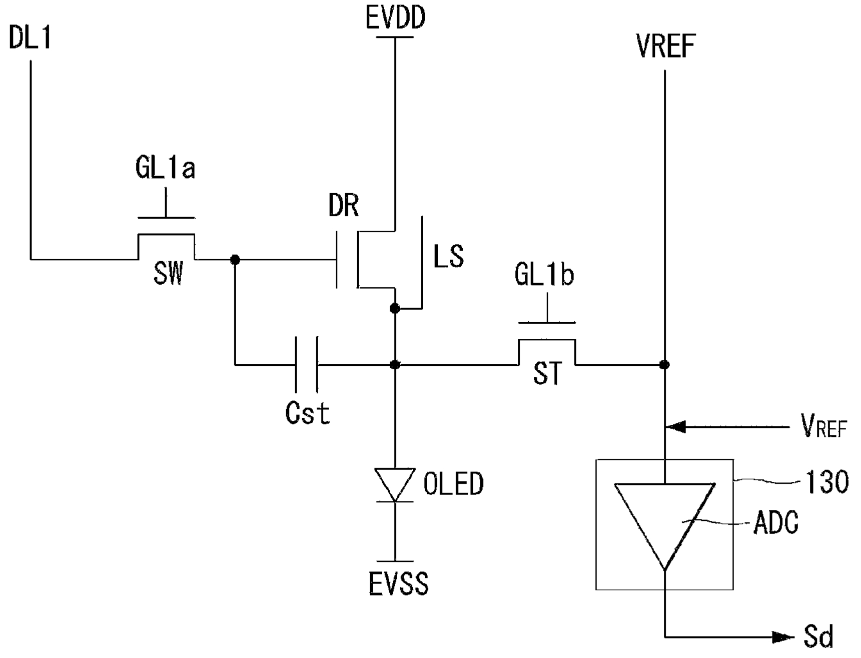
FIGS. 6 to 8 are views for explaining a method for correcting voltage variations according to the test example.
Figure 7:
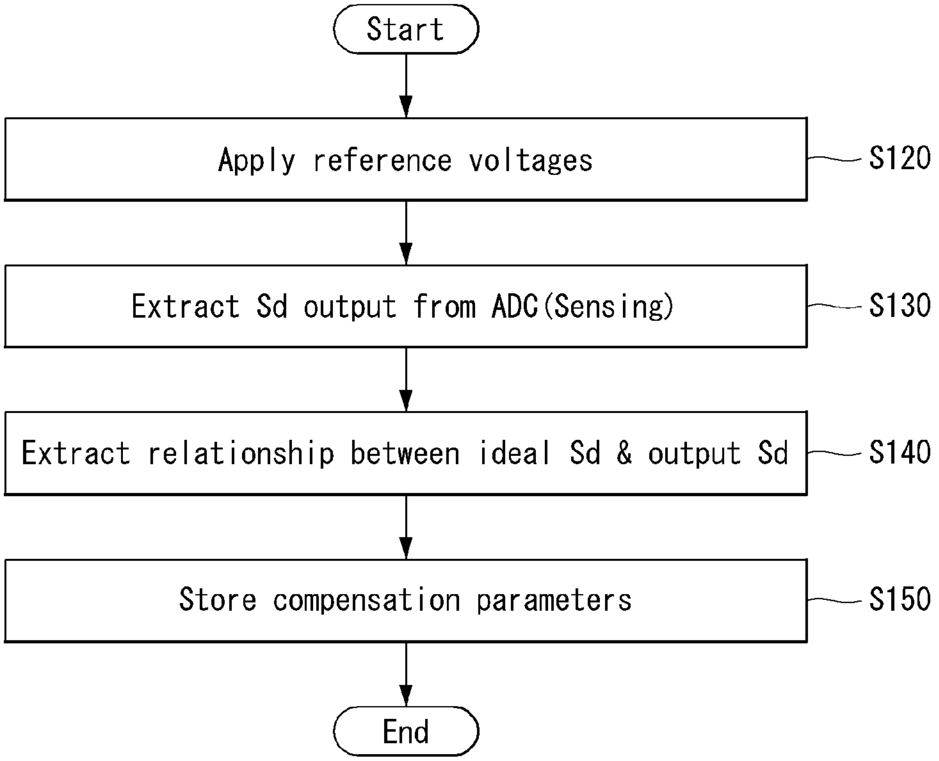
Figure 8:
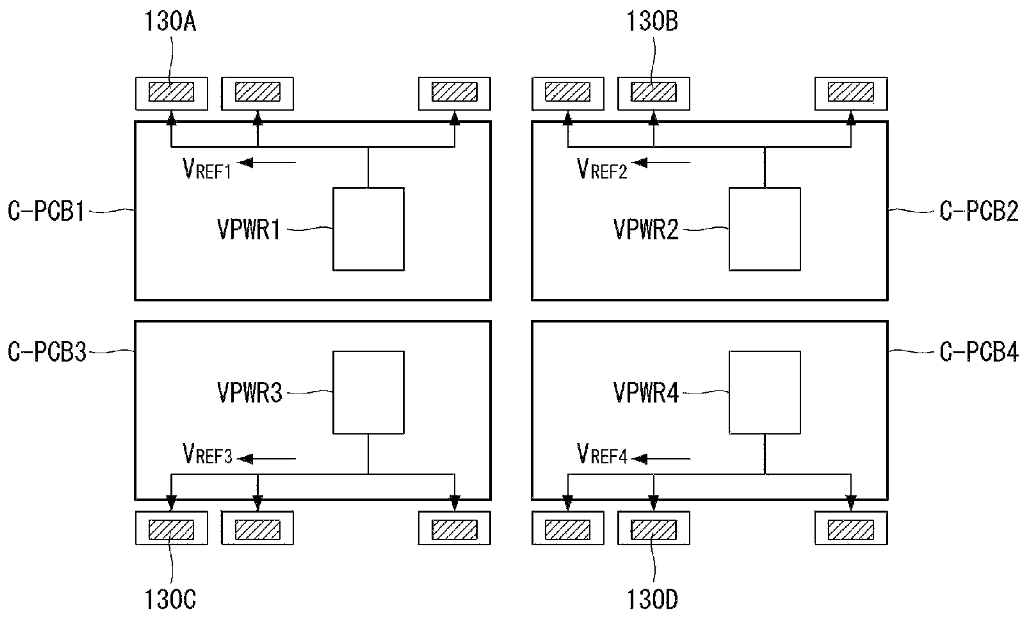
Figure 9:
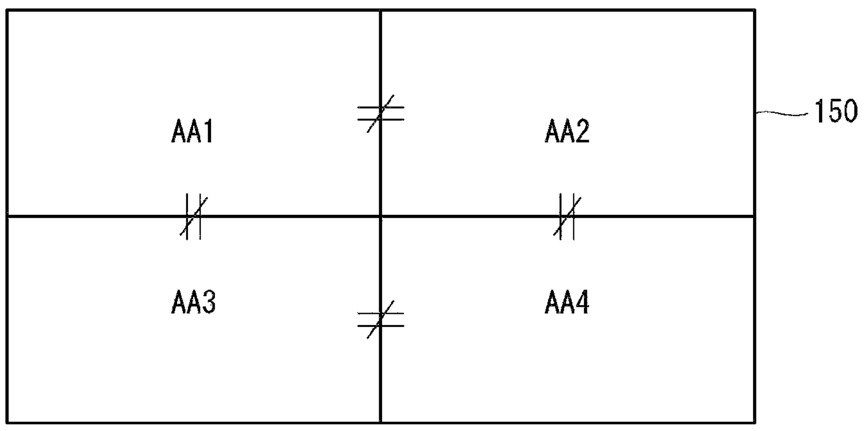
FIG. 9 is a view showing problems with the test example.

FIG. 5 is a schematic block diagram of an organic light-emitting display according to a test example. FIGS. 6 to 8 are views explaining a method for correcting voltage variations according to the test example. FIG. 9 is a view showing problems with the test example.

Referring to FIG. 5, the organic light-emitting display according to the test example comprises a high-resolution display panel 150. The high-resolution display panel 150 has a first display area AA1, a second display area AA2, a third display area AA3, and a fourth display area AA4.

A first timing controller 120A and a first reference voltage generator VPWR1 are located on a first control board C-PCB1. The first timing controller 120A outputs a first data signal for the first display area AA1 of the display panel 150. The first reference voltage generator VPWR1 outputs a first reference voltage for the first display area AA1.

A second timing controller 120B and a second reference voltage generator VPWR2 are located on a second control board C-PCB2. The second timing controller 120B outputs a second data signal for the second display area AA2 of the display panel 150. The second reference voltage generator VPWR2 outputs a second reference voltage for the second display area AA2.

A third timing controller 120C and a third reference voltage generator VPWR3 are located on a third control board C-PCB3. The third timing controller 120C outputs a third data signal for the third display area AA3 of the display panel 150. The third reference voltage generator VPWR3 outputs a third reference voltage for the third display area AA3.

A fourth timing controller 120D and a fourth reference voltage generator VPWR4 are located on a fourth control board C-PCB4. The fourth timing controller 120D outputs a fourth data signal for the fourth display area AA4 of the display panel 150. The fourth reference voltage generator VPWR4 outputs a fourth reference voltage for the fourth display area AA4.

First to fourth data driver groups 130A to 130D supply the first to fourth data signals and the first to fourth reference voltages to the first to fourth display areas AA1 to AA4 of the display panel 150, based on the first to fourth data signals and the first to fourth reference voltages. The first to fourth data signals and the first to fourth reference voltages are supplied to display period on the display panel 150. The first to fourth data signals are supplied via data lines, and the first to fourth reference voltages are supplied via sensing lines.

As above, the high-resolution organic light-emitting display drives the display panel 150 in at least four sections or N sections (N is an integer of 2 or greater) because it is difficult to control frame data signals for all display areas on the display panel 150 and supply them to a single timing controller.

There are output variations between AD converters ADC of the first to fourth data driver groups 130A, 130B, 130C, and 130D. The AD converters ADC of the first to fourth data driver groups 130A to 130D serve to charge the sensing line VREF with a reference voltage and sense it. Thus, variations between the AD converters ADC need to be corrected for. A method of correcting for variations between the AD converters ADC will be described below.

As illustrated in FIG. 6, during a sensing period, the sensing line VREF stores a reference voltage output from a reference voltage generator. The switching transistor SW and the sensing transistor ST are instantly turned off. The reference voltage stored in the sensing line VREF is sensed by the AD converter ADC provided internally in the data driver 130 that drives the illustrated subpixel. The sensed analog reference voltage is converted into digital sensing data Sd (or digital reference voltage) by the AD converter ADC.

For reference, the period in which a reference voltage is stored in the sensing line VREF and sensed precedes the period in which a characteristic of the driving transistor is extracted. This is because the reference voltages output from the first to fourth reference voltage generators VPWR1 to VPWR4 need to be uniform and constant to extract a characteristic of the driving transistor and compensate for it.

As illustrated in FIGS. 5 to 8, the first to fourth reference voltage generators VPWR1 to VPWR4 are driven to apply reference voltages VREF1 to VREF4 respectively to the first to fourth display areas AA1 to AA4 of the display panel 150 (S120). Next, the sensing data Sd output from the AD converters ADC of the first to fourth data driver groups 130A to 130D is extracted (S130).

Afterwards, the step S120 of applying reference voltage and the step S130 of extracting sensing data Sd are repeated while gradually changing the reference voltage. These steps are repeated because sensing data Sd extracted through a single test alone is not enough to take into consideration variations in gain/offset parameters of the AD converters ADC included in the first to fourth data driver groups 130A to 130D and correct for them.

Next, the relationship between ideal sensing data $\underline{Sd}$ and the sensing data Sd output from the AD converters ADC is extracted (S140). Based on this, optimum compensation parameters for minimizing output variations between the AD converters ADC included in the first to fourth data driver groups 130A to 130D are extracted and stored (S150). The compensation parameters may be stored in internal registers of the first to fourth data driver groups 130A to 130D.

Using the method of the test example, the output variations between the AD converters ADC included in the first to fourth data driver groups 130A to 130D were eliminated to some extent.

However, the test example showed that there were still variations between the first to fourth reference voltage generators VPWR1 to VPWR4 placed in different sections, and this caused brightness variations on the display panel 150, as in the first to fourth display areas AA1≠AA2≠AA3≠AA4 of FIG. 9.

First Exemplary Embodiment

Figure 10:
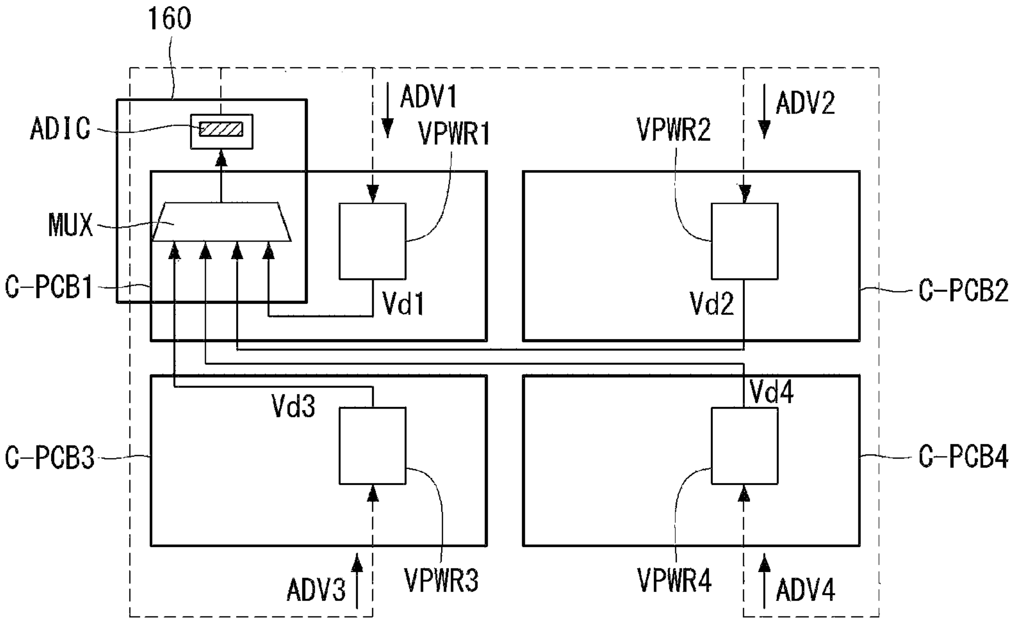
FIG. 10 is a schematic block diagram of an organic light-emitting display according to a first exemplary embodiment of the present disclosure.
Figure 11:
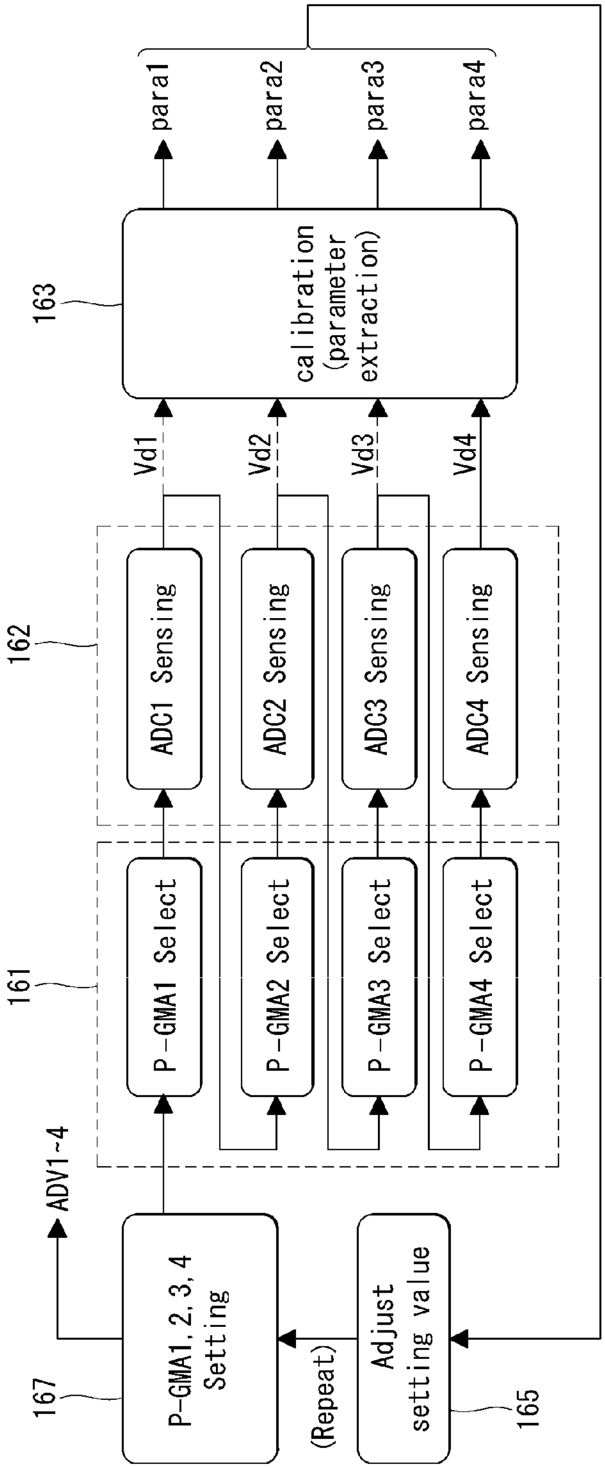
FIG. 11 is a view explaining a method for correcting voltage variations according to the first exemplary embodiment of the present disclosure.
Figure 12:
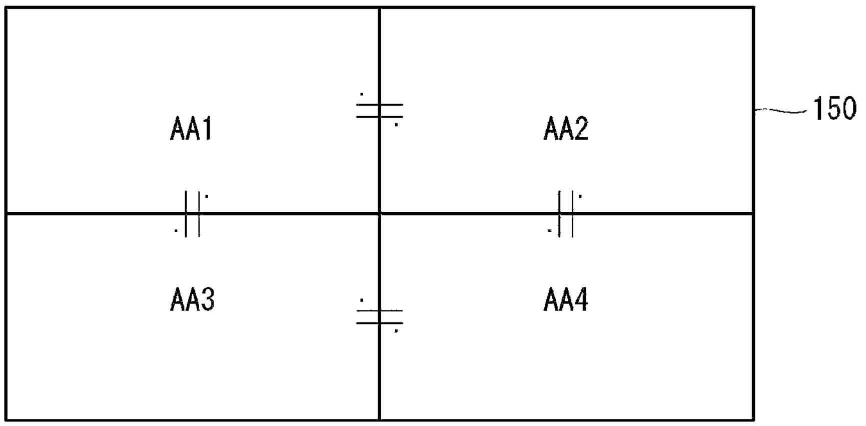
FIG. 12 is a view showing improvements made by the first exemplary embodiment of the present disclosure.
Figure 13:
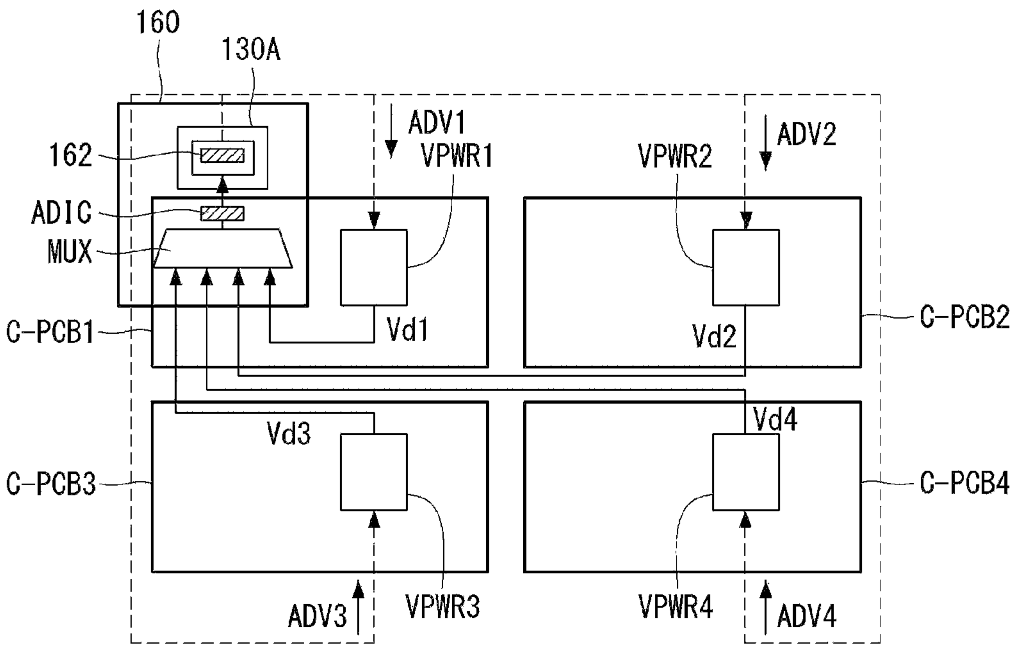
FIG. 13 is a block diagram showing a modification of the first exemplary embodiment of the present disclosure.

FIG. 10 is a schematic block diagram of an organic light-emitting display according to a first exemplary embodiment of the present disclosure. FIG. 11 is a view for explaining a method for correcting for voltage variations according to the first exemplary embodiment of the present invention. FIG. 12 is a view showing improvements made by the first exemplary embodiment of the present disclosure. FIG. 13 is a block diagram showing a modification of the first exemplary embodiment of the present disclosure.

As illustrated in FIGS. 5 and 10, an organic light-emitting display according to the first exemplary embodiment comprises a high-resolution display panel 150. The high-resolution display panel 150 has a first display area AA1, a second display area AA2, a third display area AA3, and a fourth display area AA4.

A first timing controller 120A and a first reference voltage generator VPWR1 are located on a first control board C-PCB1. The first timing controller 120A outputs a first data signal for the first display area AA1 of the display panel 150. The first reference voltage generator VPWR1 outputs a first reference voltage for the first display area AA1.

A second timing controller 120B and a second reference voltage generator VPWR2 are located on a second control board C-PCB2. The second timing controller 120B outputs a second data signal for the second display area AA2 of the display panel 150. The second reference voltage generator VPWR2 outputs a second reference voltage for the second display area AA2.

A third timing controller 120C and a third reference voltage generator VPWR3 are located on a third control board C-PCB3. The third timing controller 120C outputs a third data signal for the third display area AA3 of the display panel 150. The third reference voltage generator VPWR3 outputs a third reference voltage for the third display area AA3.

A fourth timing controller 120D and a fourth reference voltage generator VPWR4 are located on a fourth control board C-PCB4. The fourth timing controller 120D outputs a fourth data signal for the fourth display area AA4 of the display panel 150. The fourth reference voltage generator VPWR4 outputs a fourth reference voltage for the fourth display area AA4.

First to fourth data driver groups 130A to 130D supply the first to fourth data signals and the first to fourth reference voltages to the first to fourth display areas AA1 to AA4 of the display panel 150, based on the first to fourth data signals and the first to fourth reference voltages. The first to fourth data signals are supplied to display period on the display panel 150, whereas the first to fourth reference voltages are supplied to sensing period on the display panel 150.

The first to fourth reference voltage generators VPWR1 to VPWR4 correspond to the number of sections on the display panel 150. Accordingly, the first to fourth reference voltage generators VPWR1 to VPWR4 may consist of M reference voltage generators (M is an integer of 2 or greater). From the above description, it can be seen that M reference voltage generators and M timing controllers are individually placed on control boards.

A voltage variation corrector 160 obtains reference voltages from the first to fourth reference voltage generators VPWR1 to VPWR4. The voltage variation corrector 160 may obtain reference voltages from the first to fourth reference voltage generators VPWR1 to VPWR4 in a time-division manner, or may obtain reference voltages from a single reference voltage generator over several phases.

The voltage variation corrector 160 may extract correction parameters based on the obtained reference voltages, and minimize output voltage variations between the reference voltages output from the first to fourth reference voltage generators VPWR1 to VPWR4 based on the extracted corrected parameters.

The voltage variation corrector 160 comprises a multiplexer MUX and a correction circuit ADIC. The multiplexer MUX performs a selection operation for obtaining the reference voltages output from the first to fourth reference voltage generators VPWR1 to VPWR4 in a time-division manner, under control of external circuits such as the correction circuit ADIC or the timing controllers.

Although the multiplexer MUX may be placed on the first control board C-PCB1 by way of example, it also may be placed on one of the second to fourth control boards C-PCB2 to C-PCB4. The multiplexer MUX may obtain the reference voltages output from the second to fourth reference voltage generators VPWR2 to VPWR4 placed on the second to fourth control boards C-PCB2 to C-PCB4 by a cable system, electric wiring system, or communication system. That is, the multiplexer MUX and the reference voltage generators are connected by a cable system, electric wiring system, or communication system.

The correction circuit ADIC extracts correction parameters based on the reference voltages obtained by the multiplexer MUX, and generates correction values ADV1 to ADV4 for minimizing voltage variations between the first to fourth reference voltage generators VPWR1 to VPWR4 based on the extracted correction parameters. The correction circuit ADIC may be placed on the first control board C-PCB or another substrate, as in the case of the multiplexer MUX.

As illustrated in FIGS. 10 and 11, the correction circuit ADIC comprises a selector 161, a converter 162, a parameter extractor 163, a correction value generator 165, and an output part 167.

The selector 161 outputs selection signals VPWR1 Select to VPWR4 select for selecting one of the first to fourth reference voltage generators VPWR1 to VPWR4. The selection signals VPWR1 Select to VPWR4 Select control the selection operation of the multiplexer MUX.

The converter 162 senses the first to fourth reference voltages output from the first to fourth reference voltage generators VPWR1 to VPWR4. The converter 162 converts sensed analog voltages to digital data.

When the first selection signal VPWR1 Select is output from the selector 161, the multiplexer MUX selects the first reference voltage generator VPWR1. The first reference voltage output from the first reference voltage generator VPWR1 is obtained as first data Vd1 by a sensing operation of the converter 162. On the other hand, when the second selection signal VPWR2 Select is output, the multiplexer MUX selects the second reference voltage generator VPWR2. The second reference voltage output from the second reference voltage generator VPWR2 is obtained as second data Vd2 by a sensing operation of the converter 162.

In this manner, the selector 161 outputs third and fourth selection signals VPWR3 Select and VPWR4 Select for obtaining third data Vd3 corresponding to the third reference voltage output from the third reference voltage generator VPWR3 and fourth data Vd4 corresponding to the fourth reference voltage output from the fourth reference voltage generator VPWR4. In this case, the selector 161 may sequentially or non-sequentially output the first to fourth selection signals VPWR1 Select to VPWR4 Select.

The parameter extractor 163 extracts correction parameters para1 to para4 for minimizing output voltage variations between the first to fourth reference voltage generators VPWR1 to VPWR4 based on the first to fourth data Vd1 to Vd4 obtained by the sensing operations of the converter 162.

The correction value generator 165 generates correction values ADV1 to ADV4 to minimize output voltage variations between the first to fourth reference voltage generators VPWR1 to VPWR4 based on the extracted correction parameters para1 to para4.

The output part 167 outputs the correction values ADV1 to ADV4 generated by the correction value generator 165 and supplies them to the first to fourth reference voltage generators VPWR1 to VPWR4. The output part 167 may output an arbitrary voltage value as well as the correction values ADV1 to ADV4, so as to use it to compensate for initial voltage variations between the first to fourth reference voltage generators VPWR1 to VPWR4.

Based on the multiplexer MUX and the correction circuit ADIC, the voltage variation corrector 160 may supply an arbitrary voltage value to the first to fourth reference voltage generators VPWR1 to VPWR4 and perform sensing on them regularly and continuously to minimize voltage output variations between them. That is, a tracking operation may be performed for continuous sensing and correction, and this may prevent voltage variations that may occur later with time.

The operation of the voltage variation corrector 160 allows the first to fourth reference voltage generators VPWR1 to VPWR4 to output the same reference voltage or reference voltages whose variations converge to a certain value (which may be described as a reference voltage of an intermediate value or reference value).

As a result, in the first exemplary embodiment, the variations between the first to fourth reference voltage generators VPWR1 to VPWR4 placed in different sections may be eliminated. Thus, there are almost no brightness variations on the display panel 150, as in the first to fourth display areas AA1≈AA2≈AA3≈AA4 of FIG. 12.

As illustrated in FIG. 13, the voltage variation corrector 160 may use the AD converter included in a particular data driver 130A as the converter 162 of the correction circuit ADIC. In this case, the AD converter included in the particular data driver 130A performs sensing and correction operations based on the joint operation between the timing controller and the correction circuit ADIC. Moreover, some of the components included in the voltage variation corrector 160—for example, the selector, parameter generator, correction value generator, and output part—that may be implemented based on an algorithm may be included within the timing controller.

Second Exemplary Embodiment

Figure 14:
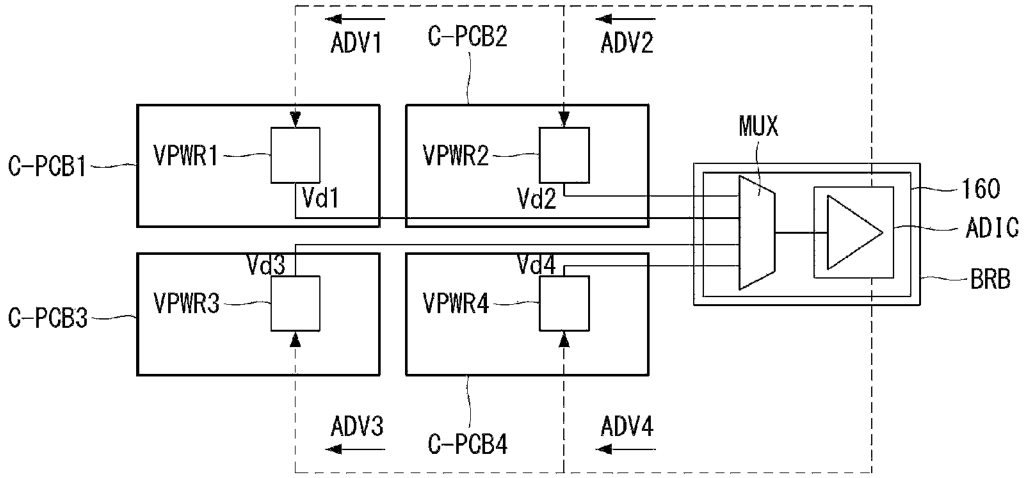
FIG. 14 is a schematic block diagram of an organic light-emitting display according to a second exemplary embodiment of the present disclosure.
Figure 15:
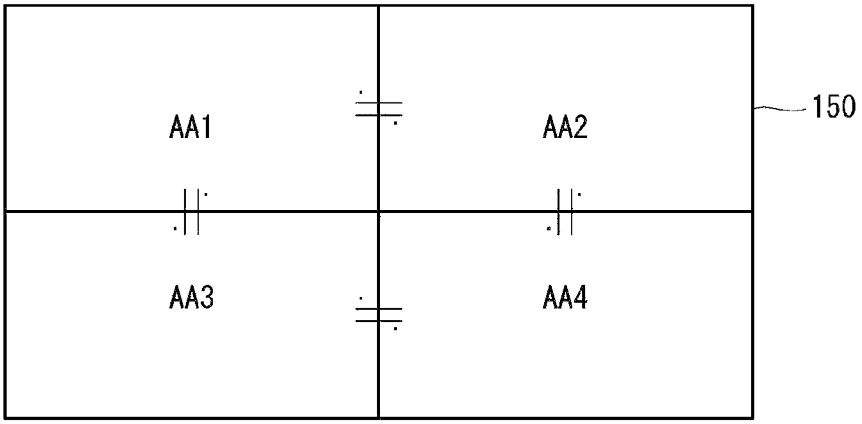
FIG. 15 is a view showing improvements made by the second exemplary embodiment of the present disclosure.

FIG. 14 is a schematic block diagram of an organic light-emitting display according to a second exemplary embodiment of the present disclosure. FIG. 15 is a view showing improvements made by the second exemplary embodiment of the present invention.

As illustrated in FIGS. 5 and 14, an organic light-emitting display according to the second exemplary embodiment comprises a high-resolution display panel 150. The high-resolution display panel 150 has a first display area AA1, a second display area AA2, a third display area AA3, and a fourth display area AA4.

A first timing controller 120A and a first reference voltage generator VPWR1 are located on a first control board C-PCB1. The first timing controller 120A outputs a first data signal for the first display area AA1 of the display panel 150. The first reference voltage generator VPWR1 outputs a first reference voltage for the first display area AA1.

A second timing controller 120B and a second reference voltage generator VPWR2 are located on a second control board C-PCB2. The second timing controller 120B outputs a second data signal for the second display area AA2 of the display panel 150. The second reference voltage generator VPWR2 outputs a second reference voltage for the second display area AA2.

A third timing controller 120C and a third reference voltage generator VPWR3 are located on a third control board C-PCB3. The third timing controller 120C outputs a third data signal for the third display area AA3 of the display panel 150. The third reference voltage generator VPWR3 outputs a third reference voltage for the third display area AA3.

A fourth timing controller 120D and a fourth reference voltage generator VPWR4 are located on a fourth control board C-PCB4. The fourth timing controller 120D outputs a fourth data signal for the fourth display area AA4 of the display panel 150. The fourth reference voltage generator VPWR4 outputs a fourth reference voltage for the fourth display area AA4.

First to fourth data driver groups 130A to 130D supply the first to fourth data signals and the first to fourth reference voltages to the first to fourth display areas AA1 to AA4 of the display panel 150, based on the first to fourth data signals and the first to fourth reference voltages. The first to fourth data signals and the first to fourth reference voltages are supplied to display period on the display panel 150.

A voltage variation corrector 160 obtains reference voltages from the first to fourth reference voltage generators VPWR1 to VPWR4. The voltage variation corrector 160 may obtain reference voltages from the first to fourth reference voltage generators VPWR1 to VPWR4 in a time-division manner, or may obtain reference voltages from a single reference voltage generator over several phases.

The voltage variation corrector 160 may extract correction parameters based on the obtained reference voltages, and minimize voltage variations between the reference voltage generators VPWR1 to VPWR4 based on the extracted corrected parameters.

The voltage variation corrector 160 comprises a multiplexer MUX and a correction circuit ADIC. The multiplexer MUX performs a selection operation for obtaining the reference voltages output from the first to fourth reference voltage generators VPWR1 to VPWR4 in a time-division manner, under control of external circuits such as the correction circuit ADIC or the timing controllers.

The correction circuit ADIC extracts correction parameters based on the reference voltages obtained by the multiplexer MUX, and generates correction values ADV1 to ADV4 for minimizing voltage variations between the first to fourth reference voltage generators VPWR1 to VPWR4 based on the extracted correction parameters.

The multiplexer MUX and the correction circuit ADIC are placed on a connection board BRB. The multiplexer MUX may obtain the reference voltages output from the first to fourth reference voltage generators VPWR1 to VPWR4 placed on the first to fourth control boards C-PCB1 to C-PCB4 by a cable system, electric wiring system, or communication system. The correction circuit ADIC may forward or transmit the correction values ADV1 to ADV4 to the first to fourth reference voltage generators VPWR1 to VPWR4 by a cable system, electric wiring system, or communication system. The multiplexer MUX and the correction circuit ADIC may temporally divide the time and operation for generating the reference voltages and the correction values.

As in FIG. 11 of the first exemplary embodiment, the correction circuit ADIC comprises a selector 161, a converter 162, a parameter extractor 163, a correction value generator 165, and an output part 167. Their functions and operations are identical to those in the first exemplary embodiment, so they will be explained by reference to FIG. 11.

In the second exemplary embodiment as well, variations between the first to fourth reference voltage generators VPWR1 to VPWR4 placed in different sections may be eliminated. Thus, there are almost no brightness variations on the display panel 150, as in the first to fourth display areas AA1≈AA2≈AA3≈AA4 of FIG. 15.

As stated above, the present invention has the advantage of improving display quality by correcting for variations between reference voltages which cause brightness variations between sections when the display panel is driven in multiple sections. The present invention has another advantage of comparing output voltages from all reference voltage generators and performing a continuous tracking operation so that these reference voltage generators output the same reference voltage or their voltage variations converge to a certain value.

What is claimed is:

1. A display device comprising:

a display panel displaying an image;

reference voltage generators that respectively supply reference voltages to display areas defined on the display panel; and a voltage variation corrector that corrects for voltage variations between the reference voltages, wherein the voltage variation corrector comprises:

a multiplexer that performs a selection operation for obtaining the reference voltages; and a correction circuit that extracts correction parameters based on the reference voltages obtained by the multiplexer and corrects for the voltage variations between the reference voltages based on the extracted correction parameters, wherein the correction circuit comprises:

a selector that outputs selection signals for controlling the multiplexer;

a converter that senses the reference voltages and converts the sensed reference voltages to digital data;

a parameter extractor that extracts the correction parameters based on the digital data corresponding to the reference voltages; and a correction value generator that generates correction values for correcting for the voltage variations between the reference voltages based on the correction parameters.

2. The display device of claim 1, wherein the voltage variation corrector performs a tracking operation for regularly correcting the voltage variations between the reference voltages.

3. The display device of claim 1, wherein either the multiplexer or the correction circuit or both are selected and placed on a same control board as one of the reference voltage generators.

4. The display device of claim 1, wherein the multiplexer and the correction circuit are electrically connected to the reference voltage generators.

5. The display device of claim 1, wherein the multiplexer and the reference voltage generators are connected by a cable system, electric wiring system, or communication system.

6. The display device of claim 1, wherein the voltage variation corrector obtains the reference voltages from the reference voltage generators in a time-division manner or obtains the reference voltages from a single one of the reference voltage generators over several phases.

7. A display device comprising:

a display panel having subpixels;

reference voltage generators that respectively supply reference voltages to display areas defined on the display panel; and a voltage variation corrector comprises a multiplexer that performs a selection operation for obtaining the reference voltages, and a correction circuit that extracts correction parameters based on the reference voltages obtained by the multiplexer and corrects for voltage variations between the reference voltages based on the extracted correction parameters, wherein the correction circuit comprises:

a selector that outputs selection signals for controlling the multiplexer;

a converter that senses the reference voltages and converts the sensed reference voltages to digital data;

a parameter extractor that extracts the correction parameters based on the digital data corresponding to the reference voltages; and a correction value generator that generates correction values for correcting for the voltage variations between the reference voltages based on the correction parameters, wherein the reference voltage generators are connected to sensing lines of the display panel, the sensing lines are connected to sensing transistors included in the sub-pixels.

* * * * *